July 22, 1958 — R. L. HAYMAN — 2,844,421
SEALING STRUCTURE
Filed Nov. 5, 1954

RICHARD L. HAYMAN
INVENTOR.

BY
ATTORNEYS

United States Patent Office 2,844,421
Patented July 22, 1958

2,844,421

SEALING STRUCTURE

Richard L. Hayman, Flintridge, Calif., assignor to Haskel Engineering Associates, Glendale, Calif., a copartnership Application November 5, 1954, Serial No. 467,018

1 Claim. (Cl. 309—23)

This invention relates to sealing structures and more particularly to those useful for sealing high pressures wherein a non-galling metallic ring is deformed to such an extent as to seat against the inner wall of a cylinder.

High pressure sealing structures have been heretofore provided in which a metallic ring is used in conjunction with an elastic O-ring to seal the space between a piston and the internal wall of a cooperating cylinder. In the operation of such prior art structures the O-ring, usually of neoprene or other non-metallic elastic material functions at relatively low pressures as the sole sealing means, but at higher pressures the force acting on the O-ring is transmitted to the metallic ring so as to deform the same into the annular space between such metallic ring and the internal wall of the cylinder, in which case, such metallic ring provides a seal at such higher pressures. While such prior art sealing structures may prove satisfactory at certain high pressures difficulties are encountered at still higher pressures occasioned by the fact that the elastic non-metallic material, such as an O-ring, is squeezed into the annular space between the metallic ring and the internal wall of the cylinder, before such metallic ring is pressed into engagement with such internal wall. Under this unfortunate condition, there is no suitable backing for the material of the O-ring that is squeezed into such annular space, and consequently at such higher pressures, the O-ring itself may be forcibly extruded out of such annular space by such higher pressure thereby impairing or destroying entirely the intended function of the O-ring.

In accordance with features of the present invention, such difficulties are obviated by placing a suitable barrier between the metallic deformable ring and the non-metallic elastic ring. Such barrier, in accordance with features of the present invention, constitutes a ring of a non-metallic cold flowing material which is known, for example, in the trade as Teflon. Such barrier, besides preventing the material of the O-ring from becoming squeezed into the annular space between the deformable metallic and the internal wall of the cylinder, acts as a means for transmitting the force developed on the O-ring to such deformable metallic ring in such a manner, so as to assure its intended function and operation.

It is therefore and object of the present invention to provide an improved sealing structure of the character outlined above.

A specific object of the present invention is to provide an improved sealing structure in which an elastic non-metallic gasket means is prevented from becoming squeezed between a metallic deformable sealing member so as to assure the desirable result indicated above.

Another specific object of the present invention is to provide improved sealing structure of this character in which a cold flowing material such as Teflon is used in a novel manner to assure the desired operation.

The features of the present invention which are believed to be novel are set forth with particularity in the appended claim. This invention itself, both as to its organization and manner of operation, together with further objects and advantages thereof, may be best understood by reference to the following description taken in connection with the accompanying drawings in which:

Figure 1:
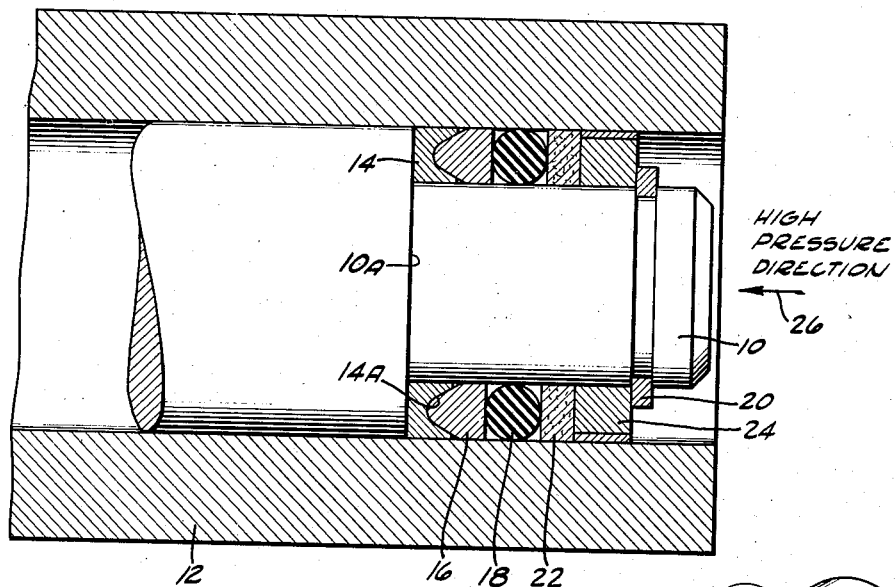
Figure 1 is a cross sectional view showing a sealing structure embodying features of the present invention.
Figure 2:
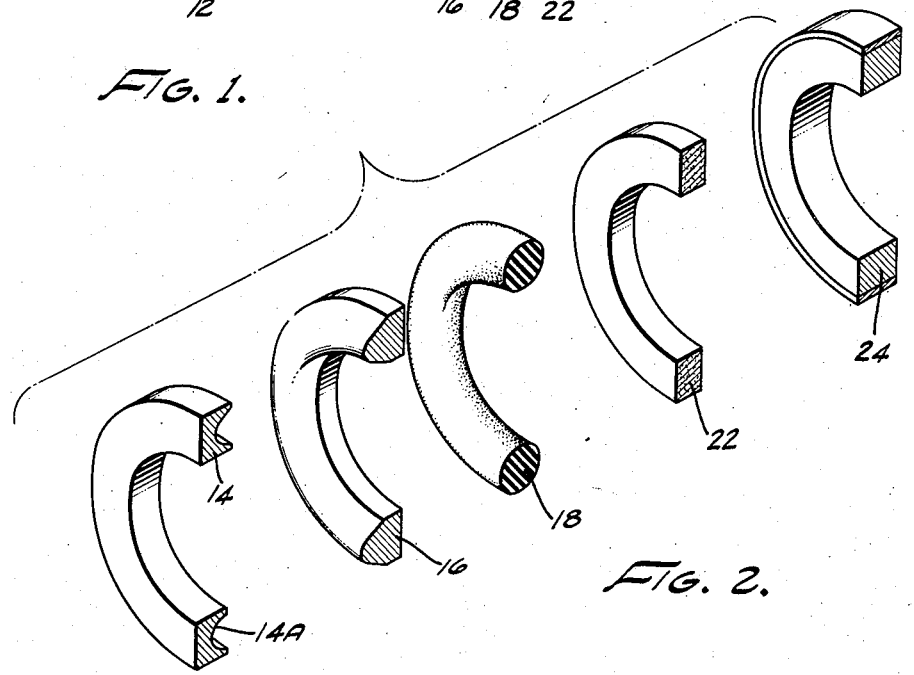
Figure 2 is an exploded view showing elements of the sealing structure in cross section.

The sealing structure illustrated in the drawing is intended to seal the annular space between a piston 10 which is movable within the cylinder 12. The piston 10 has an annular shoulder 10A against which a deformable metallic ring 14 bears. This ring 14, in the form of a small disc has an annular grooved portion 14A in one face thereof so as to form a seat for an adjacent convex face of a barrier element 16 which is of a cold flowing non-metallic material, such as Teflon. This Teflon ring 16, is provided with a planar face against which an elastic non-metallic ring 118, such as an O-ring bears. These three elements, namely, the elements 14, 16, and 18 are retained on the piston 10 by suitable means such as, for example, a retaining ring 20 which serves to retain also a leather back up ring 22 and a spacer 24. The application of pressure is in the direction indicated by the arrow 26.

At relatively low pressures, the O-ring 12 serves as a sealing means, there being insufficient pressure at this time developed on the metallic ring 14 to deform the same radially outwardly. At slightly higher or at medium pressures, the structure is sealed by not only the O-ring 18 but also by the Teflon ring 16, there being at this time sufficient force developed on the Teflon ring to deform the same. Since the Teflon material is a cold flowing material, the same is deformed by the pressure thus applied thereto to such an extent that it fills the space between the piston and the cylinder to such an extent as to prevent the material of the O-ring 18 from being squeezed into the relatively small annular space that normally exists between the metallic ring 14 and the cylinder 12. Thus, at higher pressures, a force developed on the O-ring 18 is transmitted through the Teflon ring 16 onto the bronze adapter ring 14 so as to deform the same radially outwardly whereby a metal to metal seal exists between such metallic ring and the cylinder 12.

While preferably the non-metallic gasket means 18 is a conventional O-ring, other non-metallic elastic rings of other different cross sections may be used for the purposes described above.

While the particular embodiments of the present invention have been shown and described, it will be obvious to those skilled in the art that changes and modifications may be made without departing from this invention in its broader aspects, and, therefore, the aim in the appended claim is to cover all such changes and modifications as fall within the true spirit and scope of this invention.

I claim:

In combination, a high pressure two stage sealing structure comprising a first cylindrical portion, a second cylindrical portion in the first cylindrical portion, a non-galling expansible metallic sealing member on said second cylindrical member and sealing against the first cylindrical member, elastic gasket means on said second cylindrical member for sealing against said first cylindrical member, a cold flowing cylindrical barrier of plastic material, such as Teflon, interposed between said sealing member and said gasket means and being of sufficient length, to at all times, space said gasket means from said sealing member for preventing said gasket means from becoming squeezed into the annular space between said metaillic sealing member and said first cylindrical member, said sealing member having an annular grooved portion which defines an outer deformable annular lip with a portion of said cylindrical barrier being disposed in said annular grooved portion, said barrier being effective to flow under pressure and to transmit forces developed on said gasket means to said metallic sealing member to deform said annular lip radially outwardly against said first cylindrical member, said elastic gasket means being deformable for sealing against said cylinder, said elastic gasket means being deformed at lower pressures to provide a seal between said first and second cylindrical means, and at high pressures said sealing means exerts forces on said barrier to deform said lip outwardly sufficiently to provide a seal between said first and second sylindrical members.

References Cited in the file of this patent

UNITED STATES PATENTS

| | | |
|---|---|---|
| 1,725,836 | Solberg | Aug. 27, 1929 |
| 2,188,957 | Pfauser | Feb. 6, 1940 |
| 2,494,598 | Waring | Jan. 17, 1950 |

FOREIGN PATENTS

| | | |
|---|---|---|
| 606,001 | Great Britain | Aug. 4, 1948 |